US010394778B2

(12) United States Patent
Jackson, Jr.

(10) Patent No.: US 10,394,778 B2
(45) Date of Patent: Aug. 27, 2019

(54) MINIMAL REPRESENTATION OF CONNECTING WALKS

(76) Inventor: Robert Lewis Jackson, Jr., Beitar Illit (IL)

( * ) Notice: Subject to any disclaimer, the term of this patent is extended or adjusted under 35 U.S.C. 154(b) by 321 days.

(21) Appl. No.: 13/226,299

(22) Filed: Sep. 6, 2011

(65) Prior Publication Data

US 2012/0059858 A1 Mar. 8, 2012

Related U.S. Application Data

(60) Provisional application No. 61/380,060, filed on Sep. 3, 2010.

(51) Int. Cl.

| | |
|---|---|
| ***G06F 16/00*** | (2019.01) |
| ***G06F 16/22*** | (2019.01) |
| ***G06F 16/26*** | (2019.01) |
| ***G06F 16/248*** | (2019.01) |
| ***G06F 16/28*** | (2019.01) |
| ***G06F 16/951*** | (2019.01) |

(52) U.S. Cl.

CPC ........ *G06F 16/2246* (2019.01); *G06F 16/248* (2019.01); *G06F 16/26* (2019.01); *G06F 16/282* (2019.01); *G06F 16/951* (2019.01)

(58) Field of Classification Search

CPC .. G06F 16/2246; G06F 16/951; G06F 16/282; G06F 16/26; G06F 16/248

See application file for complete search history.

(56) References Cited

U.S. PATENT DOCUMENTS

| | | | |
|---|---|---|---|
| 5,421,008 | A | 5/1995 | Banning et al. |
| 5,513,311 | A | 4/1996 | McKiel, Jr. |
| 5,515,487 | A | 5/1996 | Beaudet et al. |
| 5,546,529 | A | 8/1996 | Bowers et al. |
| 5,560,005 | A | 9/1996 | Hoover |
| 5,615,367 | A | 3/1997 | Bennett et al. |
| 5,721,900 | A | 2/1998 | Banning et al. |
| 5,749,079 | A | 5/1998 | Yong et al. |
| 5,778,377 | A | 7/1998 | Marlin et al. |
| 5,894,311 | A | 4/1999 | Jackson |

(Continued)

OTHER PUBLICATIONS

International Preliminary Report on Patentability (PCT/IB/373) and a Written Opinion of the International Searching Authority (PCT/ISA/237) dated Mar. 14, 2013 for co-pending International Application No. PCT/US2011/050567 (7 pgs).

(Continued)

*Primary Examiner* — Usmaan Saeed

(74) *Attorney, Agent, or Firm* — Radlo IP Law Group; Edward J. Radlo

(57) ABSTRACT

Systems and methods for use in representing a path in a graph of nodes. A computing device determines an acyclical collection of primary edges that collectively reach all nodes within the graph, and also determines one or more secondary edges (e.g., edges other than the primary edges) between nodes of the graph. The computing device further determines a path between a first node of the graph and a second node of the graph. The path includes one or more of the primary edges and one or more of the secondary edges. The computing device represents the path as an abbreviated path including the first node, the second node, and the secondary edges in the path. The abbreviated path excludes one or more of the primary edges in the path.

4 Claims, 7 Drawing Sheets

(56) References Cited

U.S. PATENT DOCUMENTS 5,924,094 A 7/1999 Sutter
5,933,831 A 8/1999 Jorgensen
6,067,548 A 5/2000 Cheng
6,105,018 A * 8/2000 Demers et al.
6,175,836 B1 1/2001 Aldred
6,339,767 B1 1/2002 Rivette et al.
6,370,537 B1 4/2002 Gilbert et al.
6,373,484 B1 4/2002 Orell et al.
6,377,287 B1 * 4/2002 Hao et al. .................... 715/853
6,470,383 B1 10/2002 Leshem et al.
6,496,208 B1 12/2002 Bernhardt et al.
6,519,599 B1 2/2003 Chickering et al.
6,553,371 B2 4/2003 Gutierrez-Rivas et al.
6,556,983 B1 4/2003 Altschuler et al.
6,567,802 B1 5/2003 Popa et al.
6,594,673 B1 7/2003 Smith et al.
6,714,936 B1 3/2004 Nevin, III
6,763,361 B1 7/2004 Poskanzer
6,772,180 B1 * 8/2004 Li et al. ........................ 715/229
6,792,400 B2 9/2004 Alden et al.
6,801,229 B1 10/2004 Tinkler
6,801,905 B2 10/2004 Andrei
6,810,118 B1 10/2004 Martin
6,854,091 B1 2/2005 Beaudoin
6,941,317 B1 9/2005 Chamberlin et al.
6,944,830 B2 9/2005 Card et al.
7,016,900 B2 3/2006 Gelfand
7,103,600 B2 9/2006 Mullins
7,143,615 B2 12/2006 Connor et al.
7,224,362 B2 5/2007 Kincaid et al.
7,239,985 B1 7/2007 Hysom et al.
7,251,642 B1 7/2007 Szeto
7,292,964 B1 11/2007 Mukherjee et al.
7,293,070 B2 11/2007 Moses et al.
7,320,001 B1 1/2008 Chen
7,379,926 B1 5/2008 Belniak et al.
7,383,269 B2 6/2008 Swaminathan et al.
7,392,488 B2 6/2008 Card et al.
7,454,428 B2 11/2008 Wang et al.
7,467,125 B2 12/2008 Khatchatrian et al.
7,472,114 B1 12/2008 Rowney et al.
7,512,594 B2 3/2009 Zhang
7,549,309 B2 6/2009 Beringer et al.
7,581,189 B2 8/2009 Woodall et al.
7,603,632 B1 10/2009 Aamodt et al.
7,613,712 B2 11/2009 Greenblatt et al.
7,617,185 B2 11/2009 Werner et al.
7,627,547 B2 12/2009 Jain et al.
7,640,496 B1 12/2009 Chaulk et al.
7,672,950 B2 3/2010 Eckardt, III et al.
7,710,420 B2 5/2010 Nonclercq et al.
7,716,256 B2 5/2010 Endo et al.
7,720,857 B2 5/2010 Beringer et al.
7,836,402 B2 11/2010 Martineau et al.
7,973,788 B2 7/2011 Nonclercq et al.
8,010,581 B2 8/2011 Bechtel et al.
8,041,719 B2 10/2011 Rowney et al.
8,060,540 B2 11/2011 Dang et al.
8,090,880 B2 1/2012 Hasha et al.
8,117,562 B2 2/2012 Getsch
8,171,428 B2 5/2012 Ding
8,296,666 B2 10/2012 Wright et al.
8,302,019 B2 10/2012 Litoiu et al.
8,392,467 B1 * 3/2013 Johnson ........................ 707/798
8,401,292 B2 3/2013 Park et al.
8,411,591 B2 4/2013 Bemont
8,555,166 B2 10/2013 Stanchfield
8,606,916 B2 12/2013 Anuff et al.
8,717,305 B2 5/2014 Williamson et al.
8,823,709 B2 9/2014 Grandhi et al.
8,832,111 B2 9/2014 Venkataramani et al.
8,978,010 B1 3/2015 Thumfart et al.
8,983,898 B1 3/2015 Alfonseca et al.
9,135,239 B1 9/2015 Weissman et al.
9,251,166 B2 2/2016 Grandhi et al.
9,262,514 B2 2/2016 Eckardt, III et al.
9,288,000 B2 3/2016 Kraenzel
9,307,884 B1 4/2016 Coleman et al.
9,383,911 B2 7/2016 Aymeloglu et al.
9,530,105 B2 12/2016 Veeraraghavan et al.
9,547,923 B2 1/2017 Nevin, III
2001/0034733 A1 10/2001 Prompt et al.
2002/0016670 A1 2/2002 Powell et al.
2002/0067360 A1 6/2002 Chi et al.
2002/0087571 A1 7/2002 Stapel et al.
2002/0107840 A1 8/2002 Rishe
2002/0144013 A1 10/2002 Pinard
2003/0115545 A1 6/2003 Hull et al.
2004/0088678 A1 5/2004 Litoiu et al.
2004/0090472 A1 5/2004 Risch et al.
2004/0093559 A1 5/2004 Amaru et al.
2004/0122792 A1 6/2004 Salazar
2004/0147265 A1 7/2004 Kelley et al.
2004/0181554 A1 9/2004 Heckerman et al.
2004/0205726 A1 10/2004 Chedgey et al.
2004/0205727 A1 10/2004 Sit et al.
2004/0230914 A1 11/2004 Arend et al.
2005/0004813 A1 1/2005 Gvelesiani
2005/0021538 A1 1/2005 Meyers et al.
2005/0060647 A1 3/2005 Doan et al.
2005/0108217 A1 5/2005 Werner et al.
2005/0114802 A1 5/2005 Beringer et al.
2005/0138052 A1 6/2005 Zhou et al.
2005/0160090 A1 7/2005 Harjanto
2005/0187952 A1 8/2005 Werner
2005/0207645 A1 9/2005 Nishimura et al.
2005/0251371 A1 11/2005 Chagoly et al.
2006/0007229 A1 1/2006 Nonclercq et al.
2006/0015588 A1 1/2006 Achlioptas et al.
2006/0031250 A1 2/2006 Henigman et al.
2006/0080288 A1 4/2006 MacLaurin et al.
2006/0095466 A1 5/2006 Stevens et al.
2006/0106847 A1 5/2006 Eckardt, III et al.
2006/0161557 A1 7/2006 Dettinger et al.
2006/0167931 A1 7/2006 Bobick et al.
2006/0173865 A1 8/2006 Fong
2006/0173873 A1 8/2006 Prompt et al.
2006/0197762 A1 9/2006 Smith et al.
2006/0253476 A1 11/2006 Roth et al.
2006/0265489 A1 11/2006 Moore
2007/0021994 A1 1/2007 Chandra et al.
2007/0027905 A1 2/2007 Warren et al.
2007/0061393 A1 3/2007 Moore
2007/0061487 A1 3/2007 Moore et al.
2007/0180408 A1 8/2007 Rusu et al.
2007/0198545 A1 8/2007 Ge et al.
2007/0260582 A1 11/2007 Liang
2007/0282748 A1 12/2007 Saint Clair et al.
2008/0040367 A1 2/2008 Bitonti et al.
2008/0056572 A1 3/2008 Nielsen
2008/0065655 A1 3/2008 Chakravarthy et al.
2008/0120593 A1 5/2008 Keren et al.
2008/0162207 A1 7/2008 Gross et al.
2008/0162415 A1 7/2008 Kaiser et al.
2008/0163123 A1 7/2008 Bernstein
2008/0205394 A1 8/2008 Deshpande et al.
2008/0222114 A1 9/2008 Schreiber
2008/0228697 A1 9/2008 Adya et al.
2008/0256121 A1 10/2008 Liu et al.
2008/0281801 A1 11/2008 Larson et al.
2009/0055769 A1 2/2009 Ding
2009/0064053 A1 3/2009 Crawford et al.
2009/0077011 A1 3/2009 Natarajan et al.
2009/0100086 A1 4/2009 Dumant et al.
2009/0115785 A1 5/2009 Grandhi et al.
2009/0122065 A1 5/2009 Patil et al.
2009/0125846 A1 5/2009 Anderson et al.
2009/0175543 A1 7/2009 Nielsen
2009/0182837 A1 7/2009 Rogers
2009/0204938 A1 8/2009 Schindler et al.
2009/0210631 A1 8/2009 Bosworth et al.
2009/0216780 A1 8/2009 Tantrum
2009/0240682 A1 9/2009 Balmin et al.
2009/0276733 A1 11/2009 Manyam et al.

(56) References Cited

U.S. PATENT DOCUMENTS

| | | | |
|---|---|---|---|
| 2009/0296568 | A1 | 12/2009 | Kitada |
| 2010/0011309 | A1 | 1/2010 | Mitra et al. |
| 2010/0042953 | A1 | 2/2010 | Stewart et al. |
| 2010/0076947 | A1 | 3/2010 | Kurapat et al. |
| 2010/0079460 | A1 | 4/2010 | Breeds et al. |
| 2010/0079461 | A1 | 4/2010 | Breeds et al. |
| 2010/0106914 | A1 | 4/2010 | Krishnaprasad et al. |
| 2010/0138420 | A1 | 6/2010 | Bator et al. |
| 2010/0161680 | A1 | 6/2010 | Atre et al. |
| 2010/0174754 | A1 | 7/2010 | B'Far et al. |
| 2010/0191718 | A1 | 7/2010 | Coriell et al. |
| 2010/0229130 | A1 | 9/2010 | Edge et al. |
| 2010/0325476 | A1 | 12/2010 | Zhang et al. |
| 2011/0093467 | A1 | 4/2011 | Sharp et al. |
| 2012/0229466 | A1 | 9/2012 | Riche et al. |
| 2013/0174129 | A1 | 7/2013 | Grammel et al. |
| 2014/0304214 | A1 | 10/2014 | Sakunkoo et al. |

OTHER PUBLICATIONS

International Search Report and Opinion for co-pending PCT patent application No. PCT/US2011/050567.

"Using Hibernate in a Java Swing Application," product tutorial retrieved from website http://netbeans.org/kb/docs/java/hibernate-java-se.html (12 pgs).

"View (database)," retrieved from Wikipedia at http://en.wikipedia.org/wili/View_(database) (3 pgs).

"Welcome to the dbViz, Database Visualizer project!" retrieved from website http://jdbv.sourceforge.net/dbViz/.

T. Sentissi, E. Pichat, "A graphical user interface for object-oriented database," sccc, pp. 227, 17th International Conference of the Chilean Computer Science Society (SCCC '97), 1997.

P. Sawyer, I. Sommerville, "User interface tools for object-oriented database systems," IEE Colloquium on Software Tools for Interface Design, Nov. 8, 1990, pp. 9/1-9/4, London.

"Graph Rewrite Systems for Program Optimization", Uwe Assmann, Transactions on Programming Languages and Systems, vol. 22 No. 4, published Jul. 2010, U.S.A.

"Graph-based KNN Text Classification" Zonghu Wang and Zhijing Liu, Seventh International Conference on Fuzzy Systems and Knowledge Discovery (FSKD 2010), pp. 2363-2366, published by IEEE in 2010, U.S.A.

Kennedy, J. and Barclay, P. (Eds), "Interfaces to Databases (IDS-3)", Proceedings of the 3rd International Workshop on Interfaces to Databases, Napier University, Edinburgh, Scotland, Jul. 8-10, 1996, 12 pgs.

Abello et al, "ASK-GraphView: A Large Scale Graph Visualization System", Sep./Oct. 2006, IEEE Transactions on Visualization and Computer Graphics, vol. 12, No. 5, pp. 669-675, U.S.A.

Yang et al.,"Interactive hierarchical dimension ordering, spacing and filtering for exploration of high dimensional datasets", IEEE Symposium Oct. 19-21, 2003, published in Information Visualization, 2003, U.S.A.

* cited by examiner

MINIMAL REPRESENTATION OF CONNECTING WALKS

CROSS-REFERENCE TO RELATED APPLICATIONS

This application claims the benefit of U.S. Provisional Application No. 61/380,060, filed 3 Sep. 2010, which is hereby incorporated in its entirety.

BACKGROUND OF THE INVENTION

The subject matter disclosed herein relates generally to graph data structures and, more specifically, to systems and methods for use in representing a path in a graph of nodes.

At least some known software applications use graph data structures to indicate the relationships between nodes. For example, a graph may be used to indicate how database tables are related (e.g., based on inter-table references) or the possible navigation paths through a collection of interconnected documents, such as web pages with hyperlinks.

Notably, at least some software applications represent a path through a graph by indicating every node in the path. For example, the representation of a path, whether textual or graphical, may include a complete sequence of graph nodes in the path. One may attempt to abbreviate the representation by omitting nodes between endpoint nodes. However, in some scenarios, a graph includes cyclical relationships (e.g., redundant edges) among two or more nodes. In such scenarios, simply referring to the endpoint nodes renders the path ambiguous, as the abbreviated representation does not indicate which edge of the redundant edges is included in the path.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for use in representing a path in a graph of nodes. A computing device determines an acyclical collection of primary edges that collectively reach all nodes within the graph, and also determines one or more secondary edges (e.g., edges other than the primary edges) between nodes of the graph. The computing device further determines a path between a first node of the graph and a second node of the graph. The path includes one or more of the primary edges and one or more of the secondary edges. The computing device represents the path as an abbreviated path including the first node, the second node, and the secondary edges in the path; the abbreviated path excludes one or more of the primary edges in the path. The computing device outputs the abbreviated path.

In another aspect, a device including a memory device and a processor coupled to the memory device is provided. The memory device stores a graph of nodes connected by edges. The processor is programmed to determine an acyclical collection of primary edges that collectively reach all nodes within the graph and one or more secondary edges (e.g., edges other than the primary edges) between nodes of the graph. The processor is also programmed to determine a path between a first node of the graph and a second node of the graph, the path including one or more of the primary edges and one or more of the secondary edges. The processor is further programmed to represent the path as an abbreviated path including the first node, the second node, and the secondary edges in the path; the abbreviated path excludes at least one of the primary edges in the path.

In yet another aspect, one or more non-transitory computer-readable media having computer-executable instructions embodied thereon are provided. When executed by at least one processor, the computer-executable instructions cause the processor to: determine an acyclical collection of primary edges that collectively reach all nodes within a graph that includes a plurality of nodes connected by edges. The computer-executable instructions also cause the processor to determine one or more secondary edges (e.g., edges other than the primary edges) between nodes of the graph. The nodes connected by each secondary edge are endpoints of the secondary edge. The computer-executable instructions further cause the processor to determine a tree including a plurality of nodes within the graph; the tree includes endpoint nodes connected by one or more of the primary edges and one or more of the secondary edges. The computer-executable instructions also cause the processor to represent the tree as an abbreviated tree including the endpoint nodes of the tree and the endpoint nodes of the secondary edges; the abbreviated tree excludes at least one of the primary edges in the path.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
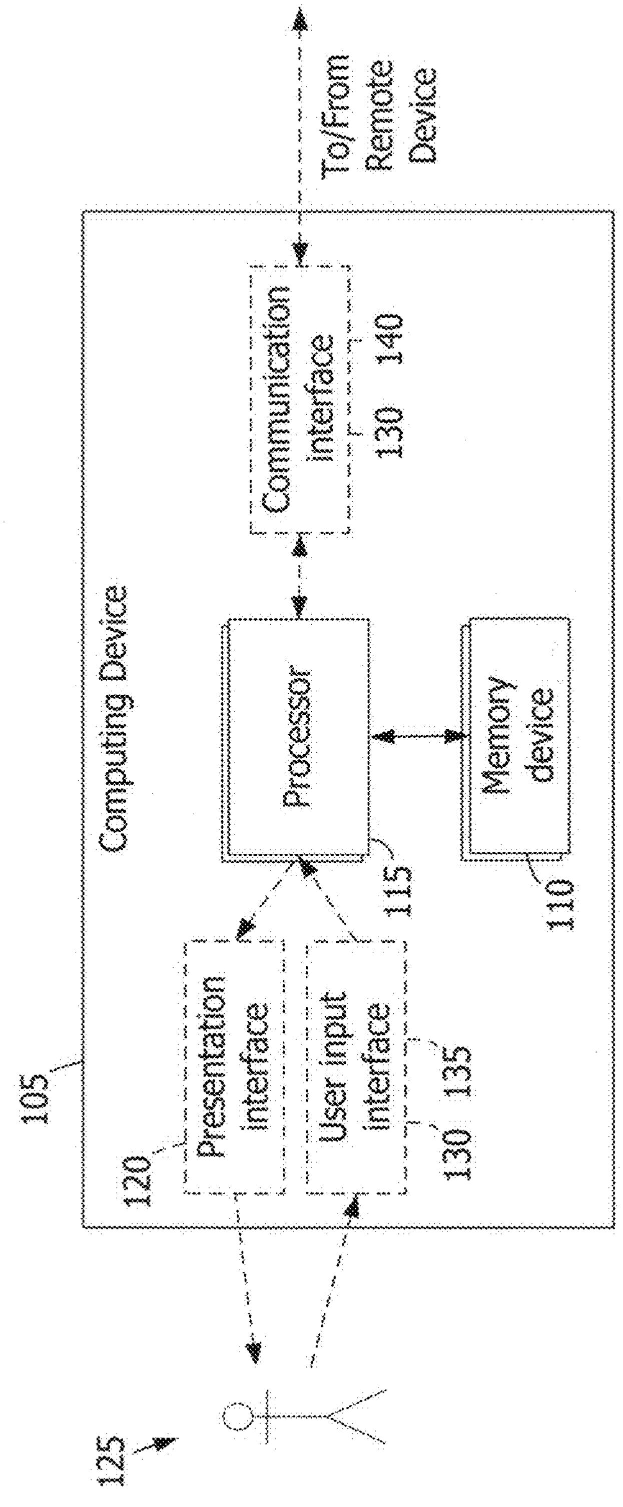
FIG. 1 is a block diagram of an exemplary computing device.

Graphs play a prevalent part in many applications, and especially in many graphical user interfaces, where often the user does not need to see the entire graph. If there is an unambiguous path connecting two nodes, then there is no reason to present every node in the path or every edge in the path in a case when a user is only interested in the final destination. For example, suppose that a user has a project containing two files. If a file directory system contains only one path of subfolders or super folders connecting the two files, then the path between them could be represented as a single edge, and if the user needs to find out more information they can click on the edge.

In some scenarios, a graph may be represented using a sparse dynamic selection tree (SDST), in which graph nodes are classified according to a selection of one or more nodes within the graph. If the represented graph is itself a tree, then the SDST can be presented in an extremely sparse way; all of the nodes that are selected could be shown, and only the set nodes that contain more than two edges in the tree that connects the selected nodes may be shown.

Notably, the presence of cycles (e.g., redundant edges among nodes) in the graph presents problems of ambiguity in the specific path traversed to connect any two nodes that have been selected. In the context of a graph representing database tables, one may limit the joins used for querying the tables to an acyclical set, which could potentially be intuitively known to the user. However, the sets chosen are generally not intuitively known to the user, and in addition other joins are sometimes needed. Presented in more general graphical terms, the advantage of using acyclical sets of edges does remove ambiguity from connecting paths but may be too limiting for most graph applications. Aside from simply avoiding cycles, one may attempt to establish the paths most frequently desired by users in connecting nodes, and resolve ambiguities in favor of these paths. In the first place, it may be difficult to establish the most frequently desired paths, and in the second place, certainly there will be times when the user intends a different path in many applications.

Embodiments described herein facilitate representing a path in a graph of nodes that includes cycles in a manner that avoids cycle-based ambiguity without indicating each and every node in the path.

In exemplary embodiments a walk tree for a given graph is defined as a tree derived from a sequence of walks within the graph such that the following statements are true: 1) the starting vertex for every walk but the first is one of the vertices contained in a prior walk; 2) any vertex i other than the starting vertex for every walk that has been visited in a prior walk is assigned a unique new node i' (thereby keeping the walk tree acyclical); and 3) any repeating vertex i in a given complex walk is renamed i' and treated as a different node (thereby making every individual walk simple).

One application of a walk tree is to store a specific way that a set of nodes could be connected within a graph. This may be beneficial for any application in which certain graph nodes are selected, and in which the specific path traversed to reach every one of them is significant. For example, the history of a user's traversal through hyperlinked documents where many sessions could be kept open at the same time could be stored as a walk tree. As long as the user does not open more than one link from a given document, a long sequence of hyperlinked traversals could be regarded as a single walk; once the user traverses a second link from the same document, a new walk is created.

A walk tree can be "minimally" represented (e.g., expressed in an abbreviated form), textually and/or graphically, when the edges of the graph have been classified as primary versus secondary. A primary edge may be defined as any edge in a designated spanning tree of the graph that reaches all graph nodes; any non-primary edge is secondary. Walk trees can be simply and intuitively specified textually as sets of nodes connected by primary edges (e.g., omitting primary edges between the nodes), where these sets are connected by secondary edges, as described in more detail below with reference to FIGS. 6 and 7. A walk tree can similarly be presented minimally graphically, where any path of primary edges is presented as a single edge. Furthermore, sets of nodes can be connected trivially by using only primary edges unless secondary edges are specified explicitly. An application can also incrementally add walks to a walk tree, either by explicitly specifying the walk or by specifying the end vertex and any secondary edges to be traversed.

An exemplary technical effect of the methods, systems, and apparatus described herein includes at least one of (a) determining an acyclical collection of primary edges that collectively reach all nodes within the graph; (b) determining one or more secondary edges between nodes of the graph, wherein the secondary edges are edges other than the primary edges; (c) determining, by the computing device, a path between a first node of the graph and a second node of the graph, wherein the path includes one or more of the primary edges and one or more of the secondary edges; (d) representing, by the computing device, the path as the first node, the second node, and the secondary edges in the path, wherein the representation of the path does not include any primary edges; and (e) outputting, by the computing device, the representation of the path.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, a database schema, database queries, a hierarchy of data nodes (e.g., data sets and data objects), node types, computer-executable instructions, and/or any other type of data.

In some embodiments, computing device 105 includes a presentation interface 120 that is coupled to processor 115. Presentation interface 120 presents information, such as data objects and/or classification strategies, to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In exemplary embodiments, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
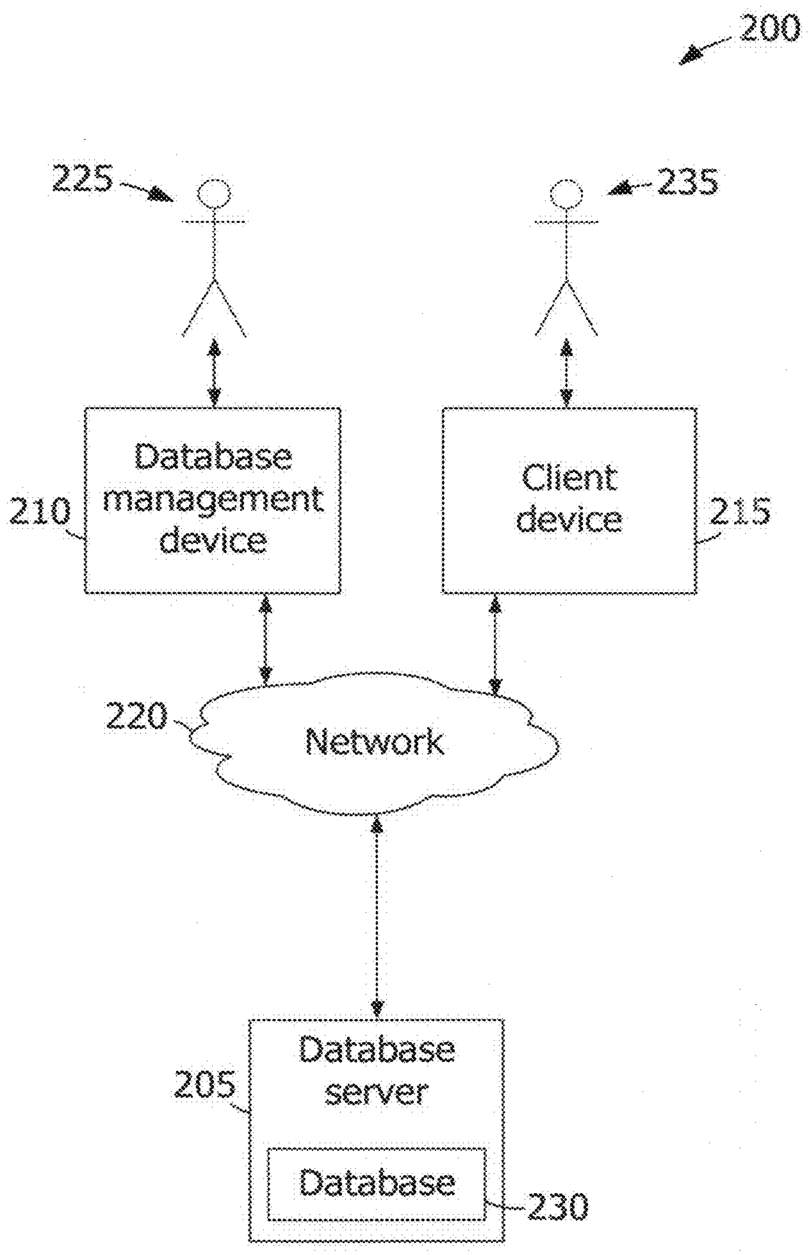
FIG. 2 is a block diagram of an exemplary computing system that includes a server, a database management device, and a client device.

FIG. 2 is block diagram of an exemplary system 200 including a server 205, a database management device 210, and a client device 215 coupled in communication via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform any portion or the entirety of the described operations.

In exemplary embodiments, server 205, database management device 210, and client device 215 are computing devices 105 (shown in FIG. 1). Each computing device 105 is coupled to network 220 via a communication interface 140 (shown in FIG. 1). In an alternative embodiment, server 205 is integrated with database management device 210 and/or with client device 215.

Server 205 stores data that is accessible by client device 215. In some embodiments, server 205 executes a database 230 that stores data in a structured format, such as tables with a plurality of columns and rows. In such embodiments, server 205 receives and responds to requests from database management device 210 and client device 215, as described in more detail below. In addition, or alternatively, server 205 may provide data to client device 215 from a source other than database 230. For example, server 205 may transmit files stored at server 205 or some other device to client device 215. As another example, server 205 may execute a software application, such as a web service, that provides data to client device 215.

Database management device 210 interacts with a database administrator 225 (e.g., via user input interface 135 and/or presentation interface 120). For example, database management device 210 may be configured to receive database schema data, such as definitions of tables and/or columns in a relational database, from database administrator 225. Database management device 210 transmits the schema data to server 205 via network 220. Server 205 receives and applies the schema data to database 230.

Client device 215 interacts with a user 235 (e.g., via user input interface 135 and/or presentation interface 120). For example, client device 215 may acquire and/or receive database schema data and/or data objects provided by database 230 and present such data to user 235. For example, client device 215 may present data using relative classification, as described in more detail below. Further, client device 215 may receive data from user 235 and submit the data to server 205, such that database 230 is updated with the submitted data.

In some embodiments, client device 215 is remote to server 205. For example, client device 215 may be located at a facility that is geographically removed from server 205 and/or database management device 210. Further, although client device 215 is described above as receiving data from server 205 and presenting the received data to user 235, in some embodiments, client device 215 presents data that is stored at client device 215. For example, client device 215 may execute database 230 and/or access data stored in one or more files at client device 215.

Figure 3:
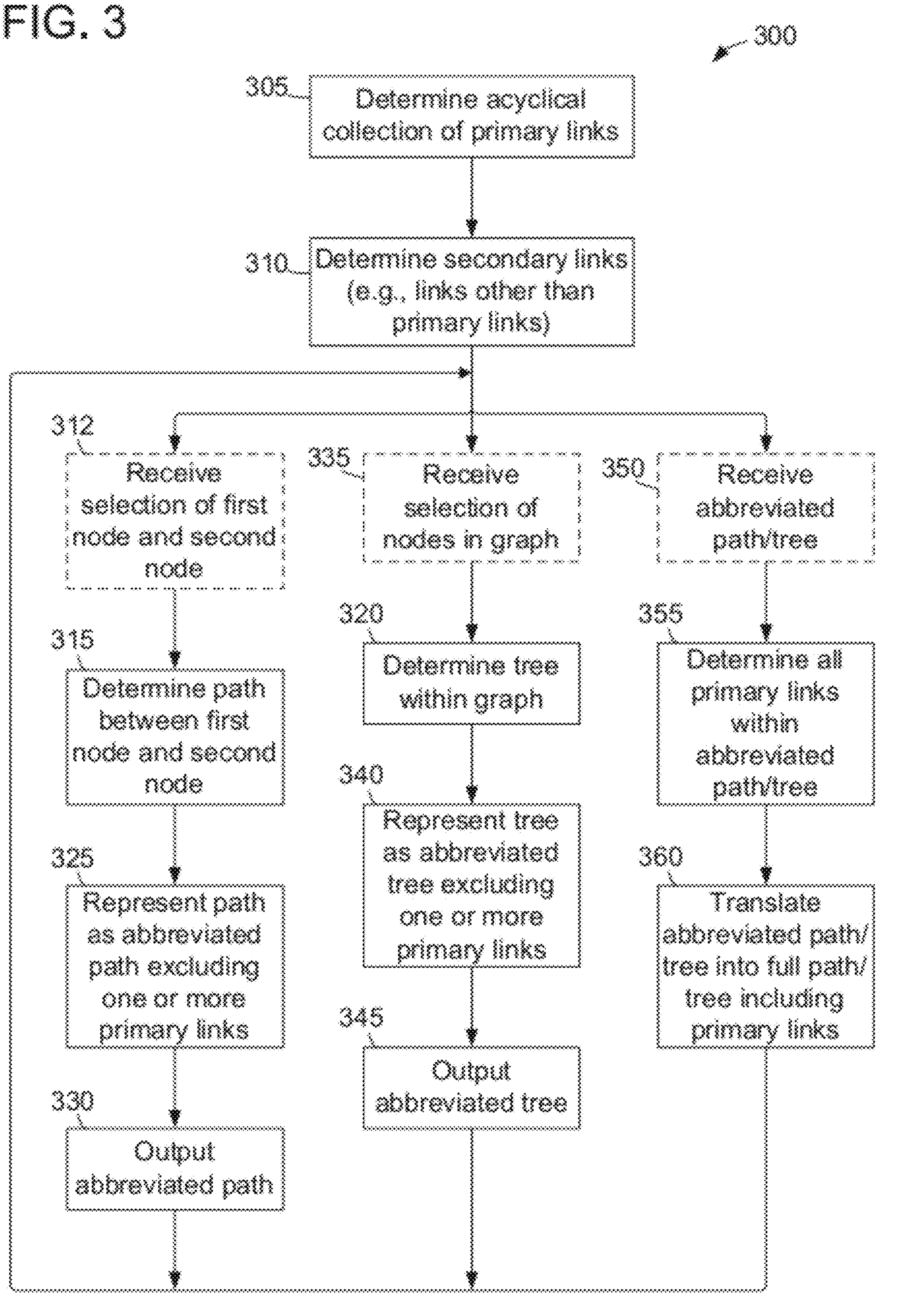
FIG. 3 is a flowchart of an exemplary method for use in representing walks (e.g., paths and/or trees) in a graph of nodes.

FIG. 3 is a flowchart of an exemplary method 300 for use in representing walks (e.g., paths and/or trees) in a graph of nodes. Referring to FIGS. 1-3, method 300 may be performed, for example, by client device 215, database management device 210, and/or any other computing device 105.

Figure 4:
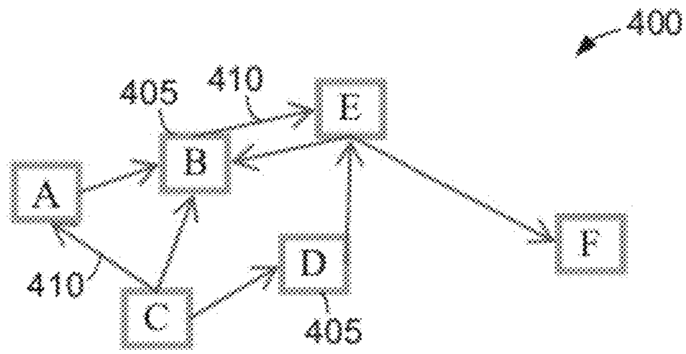
FIG. 4 is an exemplary graph of nodes interconnected by edges.

In exemplary embodiments, computing device 105 stores (e.g., in memory device 110) a graph of nodes, which are interconnected by edges. The nodes may represent database tables, interlinked documents (e.g., web pages), and/or any other collection of related items. FIG. 4 is an exemplary graph 400 of nodes 405 interconnected by edges 410.

Figure 5:
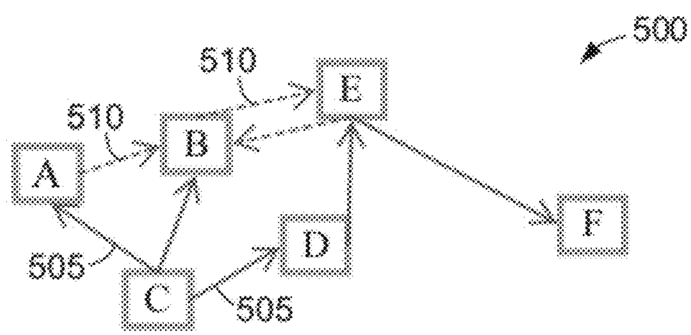
FIG. 5 is an illustration of a graph similar to the graph shown in FIG. 4 with some edges designated as primary edges and some edges designated as secondary edges.

Referring to FIGS. 1, 3, and 4, computing device 105 determines 305 an acyclical collection of edges 410 (e.g., a collection that includes no redundant edges between any two nodes) that collectively reach all nodes 405 within the graph. The edges 410 in the acyclical collection are referred to herein as primary edges. Computing device 105 also determines 310 one or more secondary edges between nodes of the graph. For example, the secondary edges may include all edges in the graph other than the primary edges. FIG. 5 is an illustration of a graph 500 similar to graph 400 (shown in FIG. 4) with some edges designated as primary edges 505 and some edges designated as secondary edges 510.

In some embodiments, computing device 105 determines 305 which edges in graph 400 are primary and determines 310 which are secondary by defining a spanning tree in which every node is reachable from a root node. All edges in the spanning tree are treated as primary, and all other edges are treated as secondary. Any algorithm that finds a spanning tree could be used. In an undirected graph, the condition of connectivity may be met automatically, because by definition an undirected spanning tree is connected. Notably, collections of primary edges 505 other than those depicted in FIG. 5 may exist within graph 400.

In exemplary embodiments, computing device 105 creates an array having a length equal to the number of edges in graph 400 to keep track of which edges in graph 400 are considered to be "primary". Computing device 105 initially sets all of the array values to true. Alternatively, for every edge in graph 400, computing device 105 may maintain a status field indicating whether the edge is primary or secondary.

In some embodiments, when multiple collections of primary edges (e.g., spanning trees) are available in graph 400, computing device 105 presents the possible collections, or some portion thereof (e.g., individual primary edges 505) and prompts the user to select which edge 410 is to be treated as primary. In some applications, the criteria for determining 305 primary edges are objective, and computing device 105 is programmed to automatically select which edges 410 to treat as primary. For example, edges between nodes may be classified as primary or secondary at least in part by edge type. In some embodiments, direct, or "hard", edges (e.g., in a file system) are classified as primary edges, whereas indirect, symbolic, or "soft" edges, which may also be referred to as aliases, may be classified as secondary edges.

Computing device 105 sets the primary array value corresponding to any secondary edges to false (or sets the status to secondary), thereby designating those edges as secondary. Further, in exemplary embodiments, computing device 105 maintains the designation of edges as primary or secondary as the graph is modified. For example, whenever an edge is added, computing device 105 may verify that the addition does not create a cycle of primary edges. If, however, the computing device 105 determines that the addition does create a cycle of primary edges, computing device 105 may create such the added edge as secondary. Notably, doing so facilitates preserving the validity of former specifications of walks, as described below, because the new edge would never be used except when called explicitly as a secondary edge. Alternatively, computing device 105 may determine 310 which edge should be treated as secondary and, if this is the previously defined edge, modify, ignore, and/or notify a user of any former specifications of walks that include the previously defined edge.

Similarly, whenever the graph is changed in such a way that a secondary edge could be made primary without adding a cycle, the edge may be changed to primary status. Previously specified walks may be inspected for accuracy any time a primary edge is removed or made secondary, and a user may be notified of any inaccuracies.

With the primary and secondary edges defined, computing device 105 determines a walk tree (e.g., a simple path or a tree combining multiple paths) within the graph based on a sequence of nodes within the graph and the edges traversed to get to each node. The determination 315 of a single path is described first below, followed by a description of the determination 320 of a tree.

In some embodiments, computing device 105 receives 312 a selection of a first node and a second node from a user (e.g., via an input interface 130), and computing device 105 determines 315 a path between the first node and the second node based on the selection. In other embodiments, computing device 105 determines 315 a path between a first node and a second node specified through some other means, such as nodes determined to be significant by a software application executed by computing device 105.

The path includes one or more of the primary edges and zero or more of the secondary edges within the graph. In some embodiments, computing device 105 determines 315 the path based on a selection of one or more secondary edges within the graph. For example, the user may select a secondary edge between two nodes at the time that the user specifies the two nodes. As another example, computing device 105 may track and/or access a sequence of nodes (e.g., the first node and the second node) selected by the user, such as by navigating among interlinked documents.

Computing device 105 represents 325 the path as an abbreviated path including the first node, the second node, and the secondary edges in the path. The abbreviated path excludes one or more of the primary edges in the path.

An abbreviated walk between any two graph nodes $Node_1$ and $Node_2$ (potentially including vertices, subgraphs, walks, and/or walk paths) given zero or more secondary edges $E_1$, $E_2$, . . . , $E_n$ may be represented 325 as described below.

The two nodes and secondary edges may come from a list of elements, or from some sort of programmatic environment, or from a user interaction. If no secondary edges are explicitly indicated (e.g., by a user), then the primary path between the first and second node is returned by traversing the primary tree of edges from $Node_1$ to $Node_2$.

Figure 6:
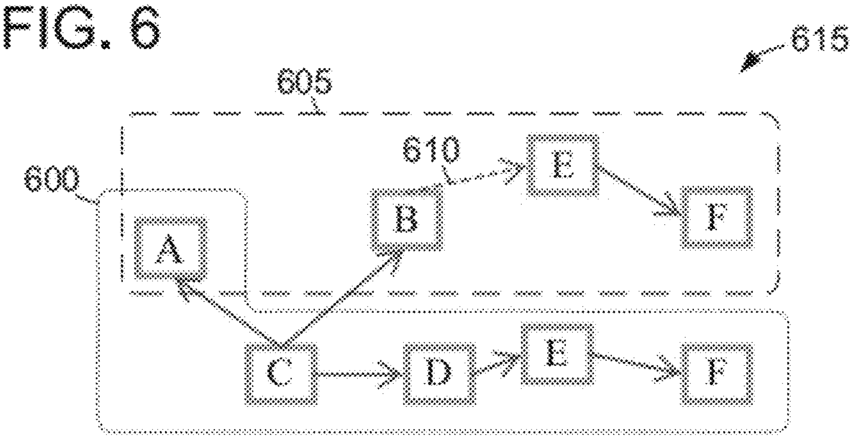
FIG. 6 is an illustration of a walk traversing primary edges from Node A to Node F, and a walk traversing a secondary edge between Node A and Node F in the graph shown in FIG. 4.
Figure 7:
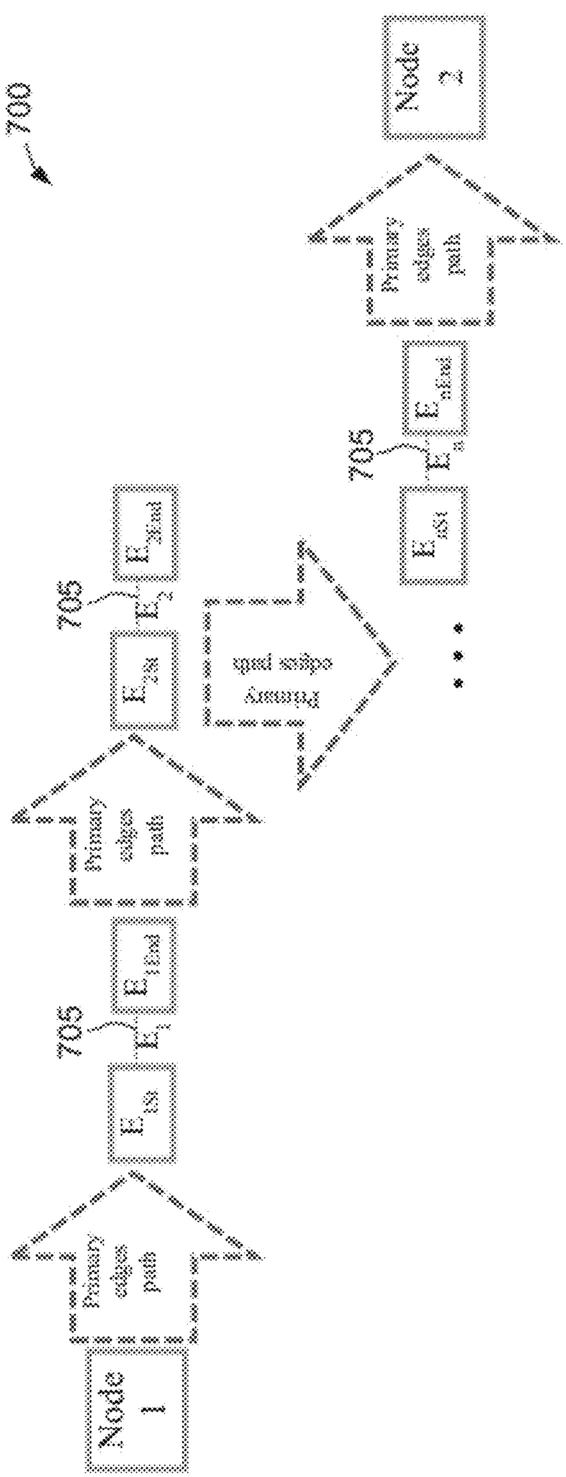
FIG. 7 is an illustration of nodes and edges in a walk tree.

For example, suppose that the user requests to connect Node A to Node F in graph 500. FIG. 6 is an illustration of a walk 600 traversing primary edges from Node A to Node F in graph 400 (shown in FIG. 4). FIG. 6 also includes a walk 605 traversing a secondary edge 610 within graph 400. FIG. 7 is an illustration 700 of nodes and edges in a walk tree. Referring to FIGS. 6 and 7, in creating a walk 605 with secondary edges 705, if one or more secondary edges $E_1$, $E_2$, . . . , $E_n$ are stated as being traversed by a walk between the two nodes, then for every secondary edge $E_i$ the primary edges are provided from the end vertex of the $E_i-1$ (or to the first graph element if $E_i-1$ does not exist) to the first vertex of $E_i$ and the primary edge path is provided from the second vertex of $E_i$ to the start vertex of $E_i+1$ (or to the second graph element if $E_i+1$ does not exist).

For example, suppose that a user or application needs to see a connecting walk from Node A to Node F via secondary edge 610 from Node B to Node E. This could be textually specified as A B.E F, with a period as a delimiter between endpoint nodes of secondary edge 610. This could be specified with parentheses added around the secondary edge and the node reached via the secondary edge, as A (B.E F), which removes ambiguity when walk trees of more than one walk are specified. For instance, in graph 500 (shown in FIG. 5), the walk A (B.E F C) may be distinguished from the walk A (B.E F) C. The path returned is a concatenation of the path from A to B, the secondary edge B→E, and the path from E to F. As another example, and referring to directionality of edges, the walk A←C→D→E→F may be represented simply as A F because all edges in the walk are designated as primary.

Figure 8:
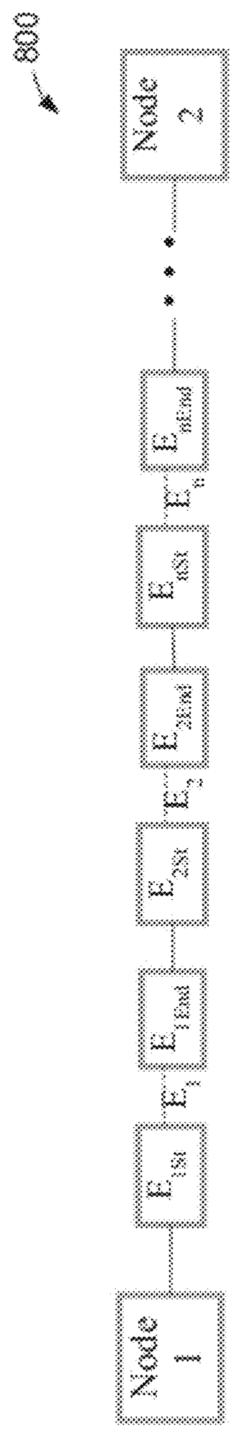
FIG. 8 is a minimal graphical representation of a path from $Node_1$ to $Node_2$, such as the path shown in FIG. 7.
Figure 9:
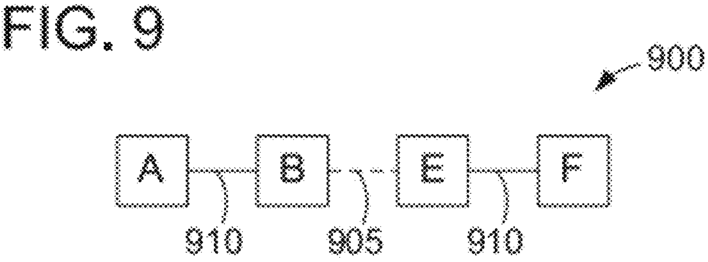
FIG. 9 is a minimized graphical representation of the walk including secondary edges in FIG. 6.

Computing device 105 outputs 330 the abbreviated path. For example, computing device 105 may output 330 a textual representation of the abbreviated path, as described above. In addition, or alternatively, computing device 105 may output 330 a minimized graphical representation of the abbreviated path (e.g., via presentation interface 120, shown in FIG. 1). FIG. 8 is a minimal graphical representation 800 of a path from $Node_1$ to $Node_2$ (e.g., as shown in FIG. 7). FIG. 9 is a minimized graphical representation 900 of walk 605 in which a secondary edge 905 is graphically distinguished from primary edges 910 by being shown with a different line pattern (e.g., dashed, as opposed to solid).

The processes described above with respect to determining 315, representing 325, and outputting 330 a path within a graph may be practiced with respect to determining 320, representing 340, and outputting 345 any number of specified graph elements (including vertices, subgraphs, walks, and/or walk trees) based on a distinction between primary and secondary edges. As described above with respect to nodes in a path, computing device 105 may receive 335 a selection of plurality of nodes within a graph and determine 320 a tree within the graph based on the selection.

The list of nodes is traversed in order. For example, a simple list might be A F (B.E F). Any elements intended to be connected via a path that traverses a given secondary edge E are listed within delimiters with a clear indication that they are to be connected to the elements before via E (for instance, E might be written at the beginning of a parenthetical list i.e. "($E_{St}$.$E_{End}$ $Element_1$ $Element_2$ $Element_n$)". A delimiter separating the start vertex from the end vertex could vary based upon direction of the edge. In an undirected edge, or an application where direction is not relevant, a simple dot could be used: B.E. In a forward edge, a greater-than character (">") could be used: B>E. In a backward edge, a less-than character ("<") could be used: B<E.

Again referring to FIG. 7, lists of elements for a given secondary edge $E_2$ can be embedded within the list of elements for $E_1$. I.e.: "($E_{1st}$.$E_{1End}$ $Element_1$ $Element_2$ . . . $Element_n$ ($E_{2st}$.$E_{2End}$ $Element_{2.1}$ $Element_{2.2}$ . . . $Element_{2.n}$))". For instance, A F (A.B (B.E F)). The path joining the first two elements is derived; for any remaining elements on the list, the path joining each element to the prior derived walk path is added to the prior walk path until all elements are connected by the walk path.

Referring to FIG. 6, for instance, and returning to the example A F (B.E F), first A F is derived, as described above with reference to walk 600 (shown in FIG. 6). Then the path from B to F, via E, described above with reference to walk 605, is in effect added to it to create a walk path 615 representing the walk A F (B.E F).

Figure 10:
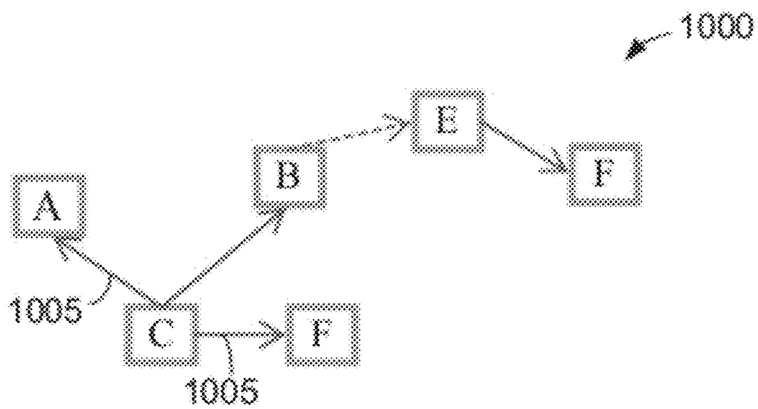
FIG. 10 is a minimal graphical representation of the walk A F (B.E F)

Graphically, a traversal could be represented in a minimal graphical form of a walk tree. FIG. 10 is a minimal graphical representation 1000 of the walk A F (B.E F). In graphical representation 1000, the entire path of primary edges between two nodes is represented by a single edge 1005. For instance, the walk A<C>D>E>F may be represented with a single edge between A and F. In exemplary embodiments, computing device 105 specifies secondary edges in a graphically distinctive way (e.g., with a distinct line pattern).

Figure 11:
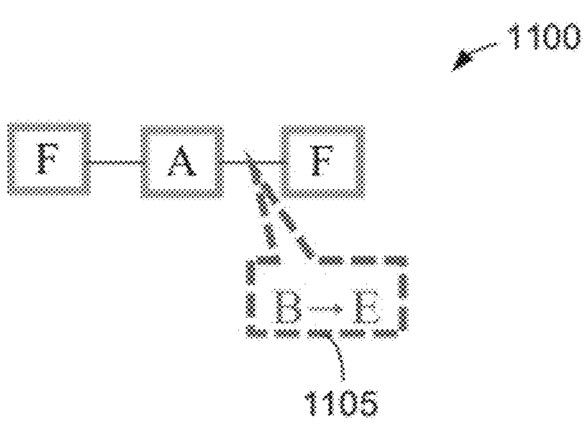
FIG. 11 is a graphical representation of the walk A F (B.E F) with a tag node representing a secondary edge B>E.

In some embodiments, computing device 105 includes in the graphical representation one or more tag nodes to indicate a secondary edge that was traversed in a path that arrived some other node. FIG. 11 is a graphical representation 1100 of the walk A F (B.E F) with a tag node 1105 representing a secondary edge B>E.

Figure 12:
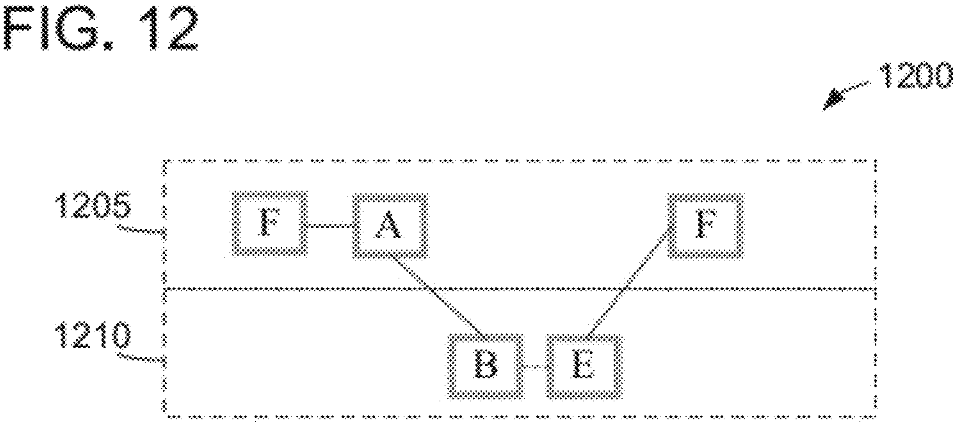
FIG. 12 is a graphical representation of the walk A F (B.E F) in a stratified form.
Figure 13:
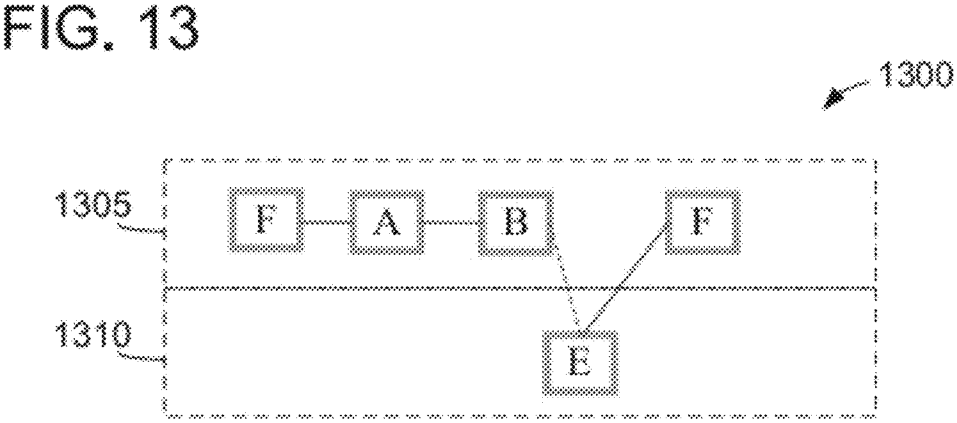
FIG. 13 is a graphical representation of the walk A F B (B.E F) in a stratified form.

In some embodiments, computing device 105 creates a graphical representation of a walk using a stratified form that distinguishes between primary and secondary edges. FIG. 12 is a graphical representation 1200 of the walk A F (B.E F) in a stratified form. Graphical representation 1200 includes a first stratum 1205 in which primary edges are depicted and a second stratum 1210 in which secondary edges are depicted. FIG. 13 is a graphical representation 1300 of the walk A F B (B.E F) in a stratified form. Like graphical representation 1200, graphical representation 1300 includes a first stratum 1305 in which primary edges are depicted and a second stratum 1310 in which secondary edges are depicted. Notably, positioning primary and secondary edges in different strata facilitates indicating the presence of secondary edges in a path and the location of such secondary edges relative to the graph.

The user may be provided an intuitive way of observing what edges of the actual graph correspond to an edge in the traversal representation. For example, in response to the user hovering with a pointing device over an edge, computing device 105 may present a list of nodes in the path represented by the single edge. A minimal graphical form might be developed incrementally within an application, or could be developed from a walk tree through a depth-first traversal that creates a subtree for every secondary edge, as shown in the pseudocode in Listing 1 below.

Textually, a traversal of a list of nodes may be stored or represented by specifying the tree of primary edges which connects the nodes. A secondary edge could be indicated by specifying the node reached via primary edges followed by a delimiter indicting edge direction and the name of the node reached via the secondary edge. For instance, A.B specifies the secondary age between A and B given that A was reached via primary edges from the node listed above.

Whenever other edges are traversed from a node reached via a secondary edge, the entire sub-tree of the traversal rooted in that node is delimited within parentheses. For instance, (A.B C D) specifies the sub-tree of a traversal rooted in B where B is reached via the secondary edge between A and B and C and D are reached via the tree of primary edges that join B, C, and D.

Note that in some applications, such as an SDST, the presence of a node in a textual specification indicates that the node is selected for some purpose (the role of the walk tree is simply to connect all of the selected nodes). In such a case, the specification of a secondary edge does not inherently imply that either vertex of the edge has been selected. Rather, the selection of a vertex may be indicated by adding the vertex to the specification separately. For instance, the walk tree A F (B.E. F) does not select B (as shown in FIG. 12), whereas A F B (B.E F) does (as shown in FIG. 13).

Walk trees may be updated incrementally (interactively and/or programmatically). The same way that one walk is appended to a pre-existing tree in generating the walk tree from a specification, a software application executed by computing device 105 may signal that a walk should be appended and the tree should be changed accordingly. One possibility would be that a user of an SDST would specify a path in selecting a new node, and the path could be appended to the tree.

Similarly, computing device 105 could receive a request to add a single node, possibly via a set of one or more secondary edges, and the walk to connect the new node to the walk tree could be derived using the method described herein. The nodes of a specification may be stored along with the walk tree, so that if one of the nodes is requested to be removed the tree can be derived again without that particular node.

Referring to FIGS. 1 and 3, regardless of the type of walk (e.g., simple or complex), computing device 105 is capable of determining the full walk based on the abbreviated form. In exemplary embodiments, computing device 105 receives 350 an abbreviated path or tree. For example, computing device 105 may receive 350 a selection of the abbreviated path or tree from a user and/or may access the abbreviated path or tree from memory based on a software application requesting the corresponding full path or tree.

Computing device 105 determines 355 all the primary links in the full path or tree based on the collection of primary links previously determined 305 and the abbreviated path or tree. For example, the abbreviated path A F may be expanded to the full path A<C>D>E>F based on the fact that this full path is the only connection between A and F in the collection of primary links. Similarly, the paths between endpoint nodes of secondary links and other selected and/or endpoint nodes may be determined based on the collection of primary links.

Computing device 105 translates 360 the abbreviated path or tree into the original path or tree by substituting the full list of edges between each node in the abbreviated path or tree. Accordingly, the full path and/or tree may be restored with no loss of data.

Exemplary pseudocode associated with abbreviated tree generation is presented in Listing 1 below.

LISTING 1

```
/* for readability, the array parent
   uses nodes as indices.
   in practice, each array
   might have an index.
*/
createMinimalGraphForm(walkTree){
   current=rootnode
/* if no root is recorded, any leaf node could be used */
   for all nodes n parent[n] <- null
   parent[current]<- current
   s.push(current)
   createNode(current, current)
   do while (not s.isEmpty)
      current = s.pop( )
      for all e in current.edges( ) {
         if e.primary==false then
            createNode(current, parent[current])
            createNode(e.otherNode, current)
            s.push(e.otherNode)
            parent[e.othernode]= e.othernode
         elseif e.isLeaf then
            createNode(e.otherNode, parent[current])
         else
            s.push(e.otherNode)
            parent[e.othernode]= parent[current]
         end if
      }
   loop
}
createNode(n,p, direction) {
   newNode(n)
   if n<>p then
      if direction==UNDIRECTED then
         newPrimaryEdge(n,p)
      elseif direction==FORWARD then
         newSecondaryForward(n,p)
      else
         newSecondaryBackward(n,p)
      end if
   end if
}
```

Exemplary pseudocode associated with generation of a textual representation of an abbreviated tree is presented in Listing 2 below.

LISTING 2

```
/* for readability, arrays
   use nodes as indices.
   in practice, each array
   might have an index.
*/
string TextSpecification(walkTree){
   for all nodes n secondaryRoot[n] <- false
   for all nodes n visited[n] <- false
   text=rootnode.ID
/* if no root is recorded, any leaf node could be used */
   s.push(rootnode)
   do while (not s.isEmpty)
      current = s.pop( )
      if visited[current] then
         if secondaryRoot[n] then text += ")" end if
      else
         for all e in current.edges( ) {
            if e.primary==false then
               select case e.direction
                  case undirected: delimiter="."
                  case forward: delimiter=">"
                  case backward: delimiter="<"
               end select
               text +=" " & current.id & delimiter & e.otherNode.id
```

-continued

LISTING 2

```
               secondaryRoot[e.otherNode]=true
               s.push(e.otherNode)
            elseif e.isLeaf then
               text += e.otherNode.id
            else
               s.push(e.otherNode)
            end if
         }
         visted[current]=true
         push[current]
      end if
   loop
   return text
}
```

Exemplary Operating Environment

Operations described herein may be performed by a computer or computing device. A computer or computing device includes one or more processors or processing units and at least one memory device, such as a system memory and/or some form of computer-readable media. By way of example and not limitation, computer-readable media comprise computer storage media and communication media. Computer storage media are non-transitory and include volatile and nonvolatile, removable and non-removable media implemented in any method or technology for storage of information such as computer-readable instructions, data structures, program modules or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

In exemplary embodiments, any portion or the entirety of the operations described herein are encoded as computer-executable instructions, which are embodied on one or more non-transitory computer-readable media. When executed by at least one processor, the computer-executable instructions cause the processor to perform the encoded operations.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for representing all the edges in an original path in a graph of nodes as an abbreviated path, the method comprising a computing device:

determining an acyclical collection of edges that collectively reach all nodes within the graph, wherein the edges in the acyclical collection are defined as primary edges, and all edges in the graph other than primary edges are defined as secondary edges;

identifying an original path between a first node of the graph and a second node of the graph, wherein the original path includes one or more primary edges and one or more secondary edges;

representing the original path as an abbreviated path, said abbreviated path including the first node, the second node, and all the secondary edges from the original path, but excluding one or more of the primary edges from the original path;

deriving the primary edges in the original path that were excluded in the abbreviated path; and reconstructing the original path from the abbreviated path based on the derived primary edges.

2. A device comprising:

a memory device for storing a graph of nodes connected by edges; and a processor coupled to the memory device and programmed to:

determine an acyclical collection of edges that collectively reach all nodes within the graph, wherein the edges in the acyclical collection are defined as primary edges, and all other edges in the graph other than primary edges are defined as secondary edges;

determine an original path between a first node of the graph and a second node of the graph, wherein the original path includes one or more primary edges and one or more secondary edges; and represent the original path as an abbreviated path, said abbreviated path including the first node, the second node, and all the secondary edges from the original path, but excluding one or more of the primary edges from the original path;

represent the original path as an abbreviated path at least in part by creating a textual representation of the abbreviated path; and create the textual representation of the abbreviated path by including, in the textual representation, just those nodes that are endpoint nodes of the abbreviated path and those nodes that are endpoint nodes of each secondary edge in the abbreviated path, said textual representation excluding at least one node from the path.

3. A device in accordance with claim 2, wherein the processor is further programmed to include, in the textual representation, delimiters between just those nodes that are endpoint nodes of each secondary edge in the abbreviated path.

4. One or more non-transitory computer-readable media having computer-executable instructions embodied thereon, wherein when executed by at least one processor, the computer-executable instructions cause the processor to:

determine an acyclical collection of edges that collectively reach all nodes within a graph that includes a plurality of nodes connected by edges, wherein the edges in the acyclical collection are defined as primary edges, and all edges in the graph other than primary edges are defined as secondary edges;

determine an original path including a plurality of nodes within the graph, wherein the original path includes endpoint nodes connected by one or more primary edges and one or more secondary edges; and represent the original path as an abbreviated path, said abbreviated path including the endpoint nodes of the original path and endpoint nodes of the secondary edges, wherein the abbreviated path excludes at least one of the primary edges from the original path;

wherein the computer-executable instructions further cause the processor to create a graphical representation of the abbreviated path by:

depicting the endpoint nodes of the abbreviated path, the endpoint nodes of the secondary edges, and the secondary edges connecting the endpoint nodes of the secondary edges; and depicting the primary edges as a single primary edge, wherein the secondary edges are graphically distinguished from the primary edges.

* * * * *